United States Patent [19]

Miyagawa et al.

[11] 4,312,581
[45] Jan. 26, 1982

[54] FILM FRAME NUMBER DISPLAY FOR CAMERA

[75] Inventors: Fumihiro Miyagawa, Yokohama; Akira Takahashi, Kawasaki, both of Japan

[73] Assignee: Ricoh Company, Ltd., Tokyo, Japan

[21] Appl. No.: 160,678

[22] Filed: Jun. 18, 1980

[30] Foreign Application Priority Data

Jun. 26, 1979 [JP] Japan .................... 54-080313

[51] Int. Cl.$^3$ .................... G03B 17/24; G03B 17/36
[52] U.S. Cl. .................... 354/106; 354/217
[58] Field of Search ........... 354/53, 288, 289, 105, 354/106, 109, 217, 218

[56] References Cited

U.S. PATENT DOCUMENTS

| | | | |
|---|---|---|---|
| 1,428,352 | 9/1922 | Altschuler | 354/105 |
| 3,831,183 | 8/1974 | Miyagawa | 354/109 |
| 3,882,512 | 5/1975 | Lawrence et al. | 354/109 |
| 4,021,828 | 5/1977 | Iura et al. | 354/217 |
| 4,114,995 | 9/1978 | Stieringer et al. | 354/289 X |
| 4,143,956 | 3/1979 | Miyagawa | 354/106 |
| 4,153,358 | 5/1979 | Yamada | 354/106 |
| 4,174,888 | 11/1979 | Hunn et al. | 354/217 X |
| 4,191,463 | 3/1980 | Urano et al. | 354/217 |

FOREIGN PATENT DOCUMENTS

| | | | |
|---|---|---|---|
| 2521158 | 11/1976 | Fed. Rep. of Germany | 354/217 |
| 2749172 | 5/1979 | Fed. Rep. of Germany | 354/217 |

OTHER PUBLICATIONS

I.B.M. Technical Disclosure Bulletin, vol. 20, No. 6, 11/1977, pp. 2472-2473.

Primary Examiner—Donald A. Griffin
Attorney, Agent, or Firm—Wyatt, Gerber, Shoup, Scobey & Badie

[57] ABSTRACT

A frame number counter is provided which counts a signal produced as a film is being conveyed, the count signal being applied to electrooptical digital display means to initiate the frame number of the film. The data which are displayed by the display means are entered onto a film surface by optical means. The display means is also capable of indicating the date and the time of day in response to an output from an electronic clock. A vibrating sound emitter is provided which becomes operative when the count in the frame number counter reaches a given value. It is also possible to provide a down counting operation of the counter.

11 Claims, 6 Drawing Figures

FILM FRAME NUMBER DISPLAY FOR CAMERA

BACKGROUND OF THE INVENTION

The invention relates to a film frame number display for camera.

In a conventional arrangement, a display which indicates the film frame number in a camera is constructed entirely mechanically, requiring a frame number display mechanism and a feed mechanism therefor, which in turn require an increased space within the camera. The display mechanism can only be used to indicate the frame number, and cannot be utilized to provide a monitor display associated with a data entry display. In addition, when rewinding the film, the mechanism is incapable of effecting a subtracting or decrementing operation.

In a conventional frame number display, an alarm is given by the appearance of a different kind of indicium whenever a given frame number is reached. Since the alarm is visual in nature, the impression upon a user is reduced, and it may be disadvantageously missed if the user fails to keep his attention thereon. In addition, in this alarm unit, the indicium is located on a given position such as 20-th or 36-th frame, for example, and it is impossible for the user of the camera to set it on a desired frame, for example, on a 24-th frame, in a selective manner.

SUMMARY OF THE INVENTION

It is an object of the invention to provide a film number display in which the frame number of a film is displayed in an electrical manner and which also is operable to function as a monitor display for data which is to be entered onto a film and also as an alarm unit operating when a given frame number is reached, thus reducing the space requirement within the camera by a concentrated information display.

It is another object of the invention to provide a film frame number display for camera capable of a decrementing operation whenever an exposed film is being rewound to indicate the termination of a rewind operation.

It is a further object of the invention to provide a film frame number display for camera providing a more impressive alarm whenever a given frame number is reached and in which the frame number where the alarm is to be produced can be arbitrarily set.

It is a feature of the invention that in a camera having a capability of data entry in which a digital representation from an electronic clock is entered onto a film, a frame number counter is provided which counts a signal which is produced as a film is being fed. The count in the counter is fed to a monitor display associated with the electronic clock to provide an electrooptical display. It is another feature of the invention that the frame number counter is capable of decrementing operation whenever the film is rewound. It is a further feature of the invention that a vibrating sound emitter is provided which becomes operative at the beginning or the end of effective frames or at any other desired frame position and wherein the position where it operates can be artbitrarily selected.

Thus, in accordance with the invention, the frame number is electrically counted and displayed, permitting a reduction in the space requirement as compared with the prior art in which the frame number has been displayed in a purely mechanical manner. Since a display used to provide data entry can be utilized as the frame number display, a further reduction in the space requirement can be achieved in a camera of data entry type. An audible alarm is produced whenever a given frame number is reached, thus giving off a more impressive alarm to assure an effective utilization of the film and to prevent a wasteful photographing operation or missing a shutter chance. The frame number where the alarm is to be produced can be chosen arbitrarily, and hence the alarm can be produced even at the beginning of effective frames of the film. It is also possible to produce the alarm at a desired intermediate point in the series of effective frames.

DESCRIPTION OF PREFERRED EMBODIMENTS

Figure 1:
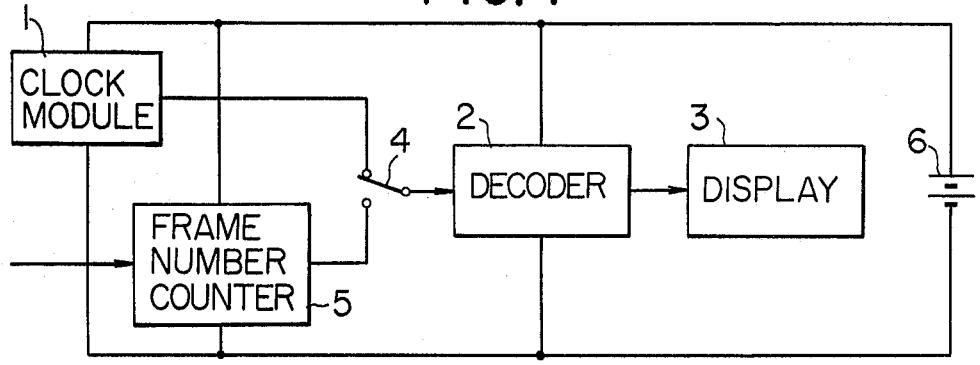
FIG. 1 is a block diagram of one embodiment of the invention.

Referring to FIG. 1, there is shown a clock module 1 which is formed as an integral assembly of counters designating different levels such as "minute," "o'clock," "day," "month" and "year" in combination with an oscillator and a frequency divider. These counters are assembled together in an integrated or a large scale integrated circuit. Individual output signals from the respective counters are fed through a selection switch 4 to the input terminal of a decoder 2. The decoder 2 converts these electrical signals into a corresponding signal which is appropriate for digital representation and which is applied to a digital display 3. The display 3 comprises an array of a plurality of display elements, each corresponding to a different one of the levels and each comprising seven light emitting elements disposed in the configuration of the FIG. 8, for example. It should be noted that the clock module 1, the decoder 2 and the display 3 are constructed as a unitary assembly in the similar manner as a digital watch. However, it is to be understood that the display 3 includes a pair of identical sections disposed in alignment with each other on the opposite sides of the clock module 1 and the decoder 2 so that one of the sections can be utilized for data entry while the other section can be used as a monitor. The data entry display section is focused onto a photographic film of the camera through optical means such as a focusing lens. The monitor display can be directly viewed from the exterior of the camera.

An output signal from a film frame number counter 5 can be selectively applied to the input of the decoder 2 by operating the switch 4. The frame number counter 5 is adapted to count a pulse signal which is produced as each frame of the film is wound up by a film winding mechanism, not shown. The counter may be stepped up for each pulse signal produced for one frame of the film, or alternatively it may count a plurality of pulses which are produced as one frame is wound up so as to be stepped upward each time it counts a given number of pulses.

The data entry section of the display 3 is activated for illumination for a given time interval which is required for data entry onto the film, in timed relationship with the shutter operation of the camera. The monitor section of the display is capable of normally displaying the date and the time of day or the film number in accordance with the position of the switch 4 which may be selectively connected with either the clock module 1 or the frame counter 5. Hence, in order to minimize the power dissipation of a battery used, it is preferred that liquid crystal display element be used for the monitor display. Also, LED elements can be preferably used for the data entry display section in order to assure that an amount of light required for the entry can be obtained. The electronic clock comprising the clock module 1 and the decoder 2, as well as the frame number counter 5 are driven from a battery 6. The "minute" and "o'-clock" levels of the data entry section may be omitted where these indications are unnecessary.

In operation, when the switch 4 is connected to the clock module 1, the display 3 is capable of displaying the year, month, and day and/or the time of day which can be entered onto a film. Since the monitor section of the display normally displays the date and/or time of day, the indication provided can be modified. When the switch 4 is connected to the frame number counter 5, the monitor section of the display 3 normally indicates the frame number in accordance with the counter signal from the frame number counter 5, thus permitting the user of a camera to recognize the frame number. When a picture is taken under this condition, a series number of the film frame can be entered onto the film. Conversely, the total number of effective frames of a film can be preset in the counter as the film is loaded into the camera, and the counter may be decremented as each film frame is fed, thus providing an indication of the number of remaining film frame.

Figure 2:
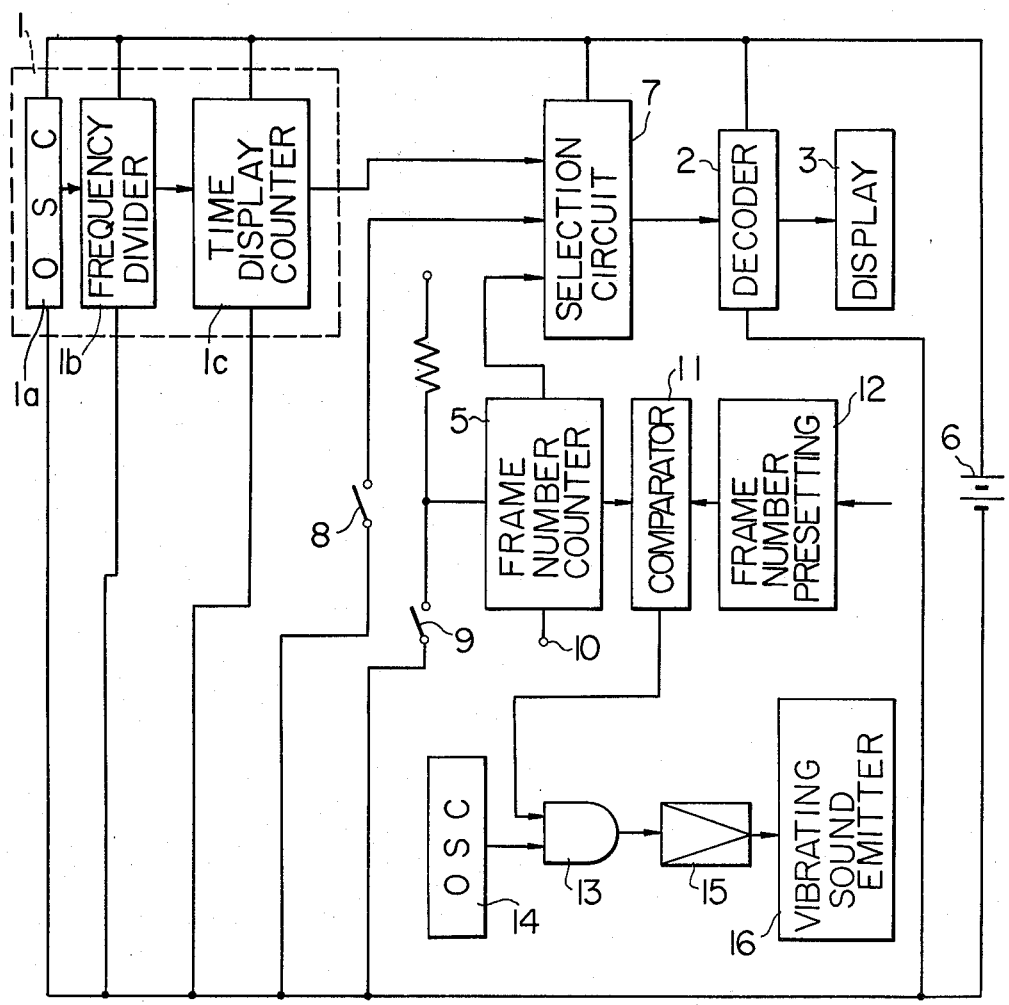
FIG. 2 is a block diagram of another embodiment of the invention.

Referring to FIG. 2, there is shown another embodiment of the invention which is basically the same as that shown in FIG. 1 and in which an alarm unit is added which gives off sound whenever a preset frame number is reached. In FIG. 2, the clock module 1 comprises an oscillator 1a, a frequency divider 1b and a plurality of counters 1c defining different levels of the time of day and the date such as "minute," "o'clock," "day," "month" and "year," all of which are assembled into a unitary construction. Output signals from individual counters 1c are applied to a selection circuit 7, which is also adapted to receive an output signal from a counter 5 which is similar to that shown in FIG. 1. A switch 8 is connected between a control terminal of the selection switch 7 and the negative terminal of the battery 6 and may be closed to enable the passage of the signals from the clock module 1 through the selection circuit 7. When the switch 8 is opened, the signal from the frame number counter 5 is enabled to pass through the selection circuit. After passing through the selection circuit 7, the signal or signals are applied to the decoder 2, which converts them into signals suitable for a digital representation before they are applied to the digital display 3. Both the decoder 2 and the display 3 are the same as those in FIG. 1. Thus, the display 3 includes a data entry section and a monitor section. The data entry section of the display is adapted to be activated for illumination for a given interval in timed relationship with the shutter operation of a camera to provide an indication of either the date or the frame number. As before, the monitor section normally displays either the date and/or the time of day or the frame number.

A switch 9 which is opened and closed each time one frame of the film is wound up by a film winding mechanism, not shown, is connected to the input terminal of the frame number counter 5, thus applying a pulse signal thereto. It is assumed that a single pulse signal produced for each frame of the film as the switch 9 is opened and closed once, and that the counter 5 is stepped for each pulse signal applied thereto. The counter 5 has a reset terminal 10 which may be connected to a switch that is operated as a rear lid of the camera is opened, for example. An output signal from the frame number counter 5 is applied to a comparator 11, which also receives an output signal from a film frame reference unit 12. The purpose of the reference unit 12 is to establish an arbitrary or desired frame number so that an alarm may be produced when the film number of the film reaches the given number. The comparator 11 compares the signal from the reference unit 12 against the signal from the frame number counter 5, and produces a signal when the count in the counter 5 becomes equal to the reference value of the frame number. The output signal from the comparator 11 is applied to one input of AND circuit 13, the other input of which is connected to an output of an oscillator 14 which produces an audio frequency. The output terminal of AND circuit 13 is connected to the input terminal of an amplifier 15, the output of which is connected to an vibrating sound emitter 16.

In operation, assuming that the switch 8 is closed, the selection circuit 7 allows the signals from the clock module 1 to pass therethrough, causing the display 3 to indicate the date and/or the time of day. By viewing the indication provided by the monitor display section, the user of the camera is capable of recognizing the data and/or the time of day. If desired, he can modify the display. When loading a fresh film into the camera, the user of the camera presets the number of effective frames in the reference unit 12. As each frame of the film is wound up, the switch 9 is opened and closed once, applying a single pulse signal to the frame number counter 5, thus stepping it. The count signal from the counter 5 can be passed through the selection circuit 7, by opening the switch 8, and thence fed to the decoder 2 and to the monitor section of the display 3, which provides a digital indication of the frame number. When the shutter operation takes place at this time, the data entry section is also activated for illumination to display the frame number, which is entered onto the film. The frame number counter 5 is stepped for each frame of the film being wound up, and its output signal is also fed to the comparator 11. When the count in the counter 5 becomes equal to the preset value in the reference unit 12, or the number of effective films which has been initially preset, the comparator 11 produces a signal which enables AND circuit 13 to pass the output signal from the oscillator 14 therethrough. The signal is amplified by the amplifier 15 to drive the vibrating sound emitter 16, which therefore gives off an audible sound, notifying that the end of effective frames of the film is reached. Since the audible sound is produced independently from an indication of the date by the display 3, the user may be safely devoted in taking pictures, and may change the film by a fresh one whenever he has recognized the audible sound. When the exposed film is being rewound before changing the film, a switch which is opened and closed by the reverse rotation of a film feeding sprocket wheel may be connected to a decrementing input terminal of the frame number counter 5, thus decrementing the frame number indicated by the display 3. This provides a positive indication of the degree of film rewind, preventing inadvertences that the rear lid may be carelessly opened in the course of the film rewind or that the leader of the film may be fed into the patrone as a result of an excessive rewind.

Since any desired frame number can be preset in the reference unit 12, any intermediate value less than the number of effective frames can be chosen. In a camera utilizing a film having a given length of leader, an arrangement is usually made such that the film is fed through a distance of several frames which correspond to the length of the leader after the film has been loaded and the rear lid closed before a photographing operation can be initiated over the effective frames. Accordingly, the reference unit 12 may be constructed so that a count corresponding to the number of frames of the leader may be preset therein so that an alarm is produced when the film is fed through a distance corresponding to the length of the leader, whereupon a photographing operation can be initiated.

For a camera utilizing films which have a uniform number of frames as a standard, the number of frames may be fixedly preset in the reference unit 12. This enables the end of a film to be warned positively. When the rear lid is opened in order to remove the exposed film, a signal is applied to the reset terminal 10 of the counter 5 to reset it.

Figure 3:
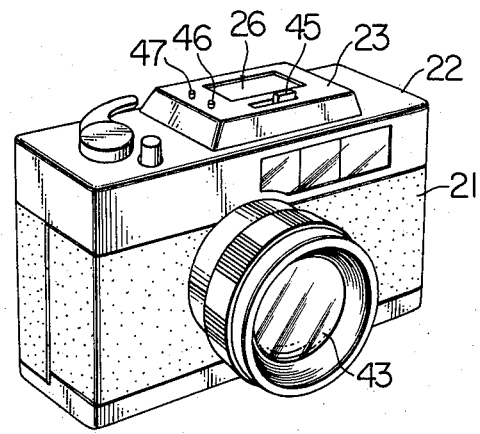
FIG. 3 is a perspective view of a camera incorporating the apparatus of the invention.
Figure 4:
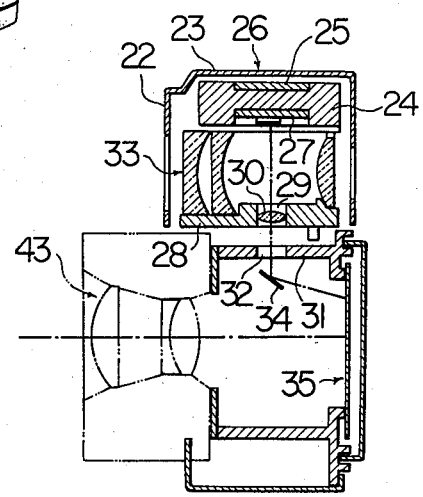
FIG. 4 is a longitudinal section of the camera shown in FIG. 3.
Figure 5:
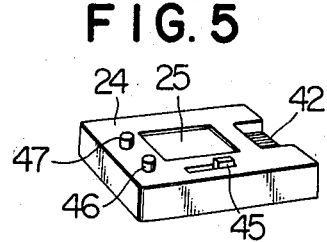
FIG. 5 is a perspective view of an electronic clock module used in the camera of FIGS. 3 and 4.
Figure 6:
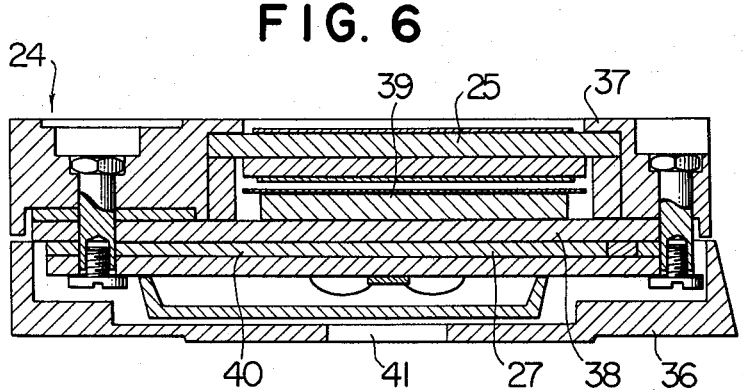
FIG. 6 is a longitudinal section of the module.

The clock module 1, the decoder 2 and the display 3 can be made as a single modular solid state element, an example of which is illustrated in FIGS. 3 to 6. Referring to FIGS. 3 and 4, a camera of rangefinder type includes a body 21, the top of which is covered by a top cover 22, which is molded to project upward over part thereof. The projecting part 23 houses an electronic clock module 24 comprising a unitary construction of the clock and the digital display. As shown in FIGS. 5 and 6, the module 24 carries a digital monitor display section 25 on its front side which can be viewed through a monitor window 26 formed in the projecting portion 23 of the top cover. Also disposed on the front side of the module 24 are a changeover switch 45 which provides a switching between a clock mode and a stop watch mode, a pushbutton switch 46 to start and stop the clock during the stop watch mode, and another pushbutton switch 47 which is used to modify the date and/or the time of day. On its rear side, the module 24 carries a digital data entry section 27 which provides the same representation as that formed by the monitor section 25. A shelf plate 28 is disposed above the body 21 of the camera and has an opening 29 formed therein at a location directly below the data entry section 27 and in which an entry lens 30 is fixedly mounted. The body of the camera includes a top end plate 31 which is formed with an opening 32 directly below the entry lens 30, and a reflecting mirror 34 is disposed in an inclined position at a location directly below the opening 32 to reflect a ray of light passing through the lens 30 sideway. A rangefinder optical system 33 is formed between the module 24 and the shelf plate 28, and the optical axis of the lens 30 extends vertically through the finder optical system 33. It will be understood that the lens 30 is adapted to focus the representation provided by the entry display section 27 onto a film, not shown, applied across a photographing frame 35 along its upper edge.

The construction of the electronic clock module 24 is shown in detail in FIG. 6. In FIG. 6, the module 24 comprises a lower casing half 36 and an upper casing half 37 which are assembled together. An LSI substrate 38 is fixedly mounted in the casing in alignment with the juncture between the casing halves 36, 37, and a clock section 39 formed by an LSI element containing an oscillator, a counter and a decoder as well as the digital monitor display section 25 are formed as separate layers on the substrate, and are vertically spaced apart by providing a suitable spacing and an insulating layer. The digital data entry display section 27 is applied to the underside of the substrate 38 with an insulating layer 40 disposed therebetween. Both of the display sections 25, 27 are driven in common from the single clock section 39, so that they provide the identical representation as mentioned previously. A slot 41 is formed in the lower casing half 36 at a location directly below the entry display section 27 to permit a representation formed by the display section 27 to be entered onto the film, as mentioned previously. As shown in FIG. 5, the module 24 includes a terminal assembly 44 through which the connection with a power supply, a data modifying switch and the frame number counter is achieved. While not shown, the power supply is disposed at a suitable location within the body 21.

It is to be understood that the entry display section 27 is activated for illumination for a given time interval which is required for the data entry onto the film, in synchronized relationship with the shutter operation, for example. On the other hand, the monitor display section 25 provides an indication normally or intermittently, as required, with a given time interval by utilizing a monitor switch. Also it should be understood that a switch which is operated in response to the depression of a shutter release button is connected in shunt with the start and stop switch 46 associated with the stop watch operation.

In operation, when the mode selection switch 45 is thrown to its position corresponding to the clock mode, the display section 27 is activated in synchronized relationship with a shutter operation to provide a data representation, which is entered, through the lens 30, onto the film along its upper edge while the image of an object being photographed is focused onto the film, applied across the photographing frame 35, through a taking lens 43 in response to a shutter release operation to open and close the shutter. The luminescent display of the display section 27 is extinguished after a given time interval which is required for the data entry.

When it is desired to confirm whether the data to be entered onto the film is correct or when it is desired to modify the data, a representation formed by the display section 25 may be viewed through the window 26 from the exterior of the camera.

When the mode selection switch 45 is thrown to its position corresponding to the stop watch mode, the pushbutton switch 46 may be depressed once to start the stop watch and depressed another time to stop it. The start and the stop of the stop watch may be initiated by the depression of a release button, permitting the required time to be entered onto the film together with the image of the object.

In this embodiment, the connection of the frame number counter permits the display to indicate the frame number of the film, as required.

What is claimed is:

1. A display for a camera including an electronic clock, an electrooptical monitor display means for providing a digital representation of an output from the electronic clock, and optical entry display means for entering the digital representation provided by the electronic clock onto a film surface; characterized by a film number counter for counting a signal which is produced as the film is being fed, the count of the counter being applied to the monitor display means to indicate the frame number of the film; in which display the electronic clock, the entry display means and the monitor display means are assembled into a single modular element, the entry display means being disposed on the inner side of the modular element and the monitor display means being disposed on the outer side of the modular element.

2. A camera to expose scenes onto a film removably held within the camera, the camera including a digital display means to display time clock data and frame number data, said display means including an electronic clock, first and second electrooptical means, each of said electrooptical means being simultaneously and selectively connectable to said electronic clock and providing a digital representation of an output from the electronic clock, viewing means to show the digital representation of said first electrooptical means to the camera user, optical means for entering the digital representations provided by the second electrooptical means onto the film surface, means to produce a signal as the film is being fed, a film number counter means for counting said signals produced as the film is being fed, and means to apply the count of the counter to the second electrooptical means which displays the frame number of the film to the camera user; in which display means the electronic clock and the first and second electrooptical means are assembled into a single modular element and in which the second electrooptical means is disposed on the inner side of the modular element and the first electrooptical means is disposed on the outer side of the modular element.

3. A camera to expose scenes onto a film removably held within the camera, the camera including a digital display means to display time clock data and frame number data, said display means including an electronic clock, first and second electrooptical means, means to produce a signal as the film is being fed, a film number counter means for counting said signals produced as the film is being fed, viewing means to show the digital representation of said first electrooptical means to the camera user, optical means for entering the digital representations provided by the second electrooptical means onto the film surface, switch means for simultaneously connecting said first and second electrooptical means alternatively to said electronic clock or to said film number counter means for providing a digital representation of an output from the electronic clock or the film number counter.

4. A film frame number display according to claim 3 in which a plurality of pulse signals are produced as one frame of a film is fed, the frame number counter being stepped when it has counted a given number of pulse signals.

5. A film frame number display according to claim 3 and further including a vibrating sound emitter and means to render said sound emitter operative whenever the film has reached a given position.

6. A film frame number display according to claim 5 in which the means to render said sound emitter operative operates the sound emitter when the film reaches the beginning of effective frames.

7. A film frame number display according to claim 5 in which the means to render said sound emitter operative operates the sound emitter when the end of the effective frames is reached.

8. A film frame number display according to claim 3 and further including a frame number reference means to allow any desired frame number to be preselected, and a vibrating sound emitter, and means to operate the sound emitter when the film number reaches the preset value in the reference means.

9. A film frame number display according to claim 3 wherein the counter is decremented during a film rewind operation.

10. A film frame number display according to claim 3 in which the electronic clock and the first and second electrooptical means are assembled into a single modular element.

11. A film frame number display according to claim 10 in which the second electrooptical means is disposed on the inner side and the first electrooptical means is disposed on the outer side of the element relative to the camera body.

* * * * *